Patented Mar. 27, 1923.

1,449,918

UNITED STATES PATENT OFFICE.

FREDERICK W. SKIRROW AND JAMES DICK, OF SHAWINIGAN FALLS, QUEBEC, CANADA, ASSIGNORS TO SHAWINIGAN LABORATORIES, LIMITED, OF MONTREAL, QUEBEC, CANADA.

PROCESS FOR THE PRODUCTION OF DIESTERS FROM VINYL ESTERS.

No Drawing. Application filed November 8, 1920. Serial No. 422,692.

*To all whom it may concern:*

Be it known that we, FREDERICK W. SKIRROW and JAMES DICK, both subjects of the King of Great Britain, and residents of the town of Shawinigan Falls, in the Province of Quebec and Dominion of Canada, have invented certain new and useful Improvements in Processes for the Production of Diesters from Vinyl Esters, of which the following is a full, clear, and exact description of the invention.

This invention relates to improvements in the manufacture of diesters of di-hydroxy or hypothetical di-hydroxy alcohols, and more especially to the manufacture of diesters of olefine alcohols.

It has been discovered that, if an ester of an olefine alcohol and a carboxylic acid are mixed with substantially the theoretical amount of the same acid in presence of a suitable catalyst, a reaction sets in, resulting in the production of a diester. The catalysts which have been found suitable in carrying out this process are certain mercuric salts, oxides of sulphur, fuming sulphuric acid or even ordinary sulphuric acid. When a mercury salt is used, it is found advantageous to precipitate the same in the reaction liquid, so as to obtain it in a very finely divided and reactive form. With certain catalysts, the reaction is quite energetic without the application of heat, requiring even in some cases external cooling. With other catalysts heating is necessary to promote the reaction. Normally, the reaction takes place at such temperatures that a portion of the liquor vaporizes and a reflux condenser should therefore be used to condense the vapors and return same to the reaction. The process is normally carried out at substantially atmospheric pressure but may be carried out at super-atmospheric or sub-atmospheric pressures.

The process may be utilized to prepare mixed esters of hypothetical di-hydroxy alcohols. The present process, however, is intended largely for the production of ethylidene diacetate from the acetic ester of vinyl alcohol, namely, vinyl acetate; but it is understood that it is not limited to this ester but may be utilized for the production of other diesters such as those of butyric acid, valeric acid, formic acid, and in fact with any carboxylic acid.

For convenience, the process will be hereafter described in its relation to the manufacture of the acetic diester, ethylidene diacetate, from vinyl acetate. If vinyl acetate and glacial acetic acid are brought together in presence of a suitable catalyst, a reaction sets in in accordance with the equation:—

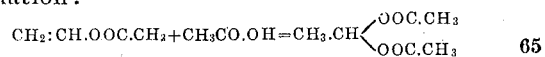

In carrying out this reaction a number of catalysts may be used. Mercuric sulphate preferably precipitated from an acetic acid solution of mercury acetate is found to be particularly satisfactory but other catalysts such as the oxides of sulphur or fuming sulphuric acid or even ordinary sulphuric acid may be used with good results. When using a mercury sulphate catalyst, the reaction sets in spontaneously and the temperature rises to 115° to 120° C. with violent ebullition and, after a short time, the acetic acid and vinyl acetate will be found to have largely combined to form ethylidene diacetate. The same result may be obtained but usually with less complete combination by using oleum or sulphuric acid or oxides of sulphur, such as sulphur dioxide or sulphuric anhydride. With these latter catalysts, heating is necessary to obtain a satisfactory reaction. In all cases, the apparatus used should include a reflux condenser, through which vapor rising from the reaction is passed, the condensate being returned into the reaction. In all cases it is advisable to agitate the mixture for obvious reasons.

The following examples will serve to illustrate the carrying out of the invention:—

*Example 1.*

100 lbs. of glacial acetic acid is placed in a vessel provided with an agitator and a coil, through which steam or cooling water may be circulated. 1 lb. of 20% oleum or an equivalent amount of concentrated sulphuric acid is added with agitation, and steam passed through the coil until the temperature reaches approximately 80° C. 143 lbs. of vinyl acetate is then added during one hour with agitation and the temperature kept preferably under 100° C., at approximately 80° to 90° C. by passing steam or water through the coil as necessary. After all the vinyl acetate has been added, the mixture is agitated at approximately 80° C. for about one hour longer. It will be found that the vinyl acetate and acetic acid have largely combined to form about 205 lbs. of ethylidene diacetate, i. e., about 85% of the amount theoretically possible based on the amount of vinyl acetate used. The liquor contains besides the ethylidene diacetate some unchanged vinyl acetate and acetic acid. The ethylidene diacetate may now be separated by distillation, the sulphuric acid being first rendered inactive by the addition of approximately 2 lbs. anhydrous sodium acetate, to avoid decomposition of the ethylidene diacetate at the higher temperature of distillation, as described in copending application, Serial Number 410,934, filed 17th September, 1920.

*Example 2.*

100 lbs. glacial acetic acid is placed in a vessel similar to that specified in Example 1 and approximately 5 lbs. of mercuric oxide is added, the temperature being raised to 70° to 80° C. Approximately 2 lbs. 70% oleum is then added to precipitate active mercuric sulphate in the manner described in copending application Serial Number 422,885, filed November 8th, 1920. 143 lbs. of vinyl acetate is run in during one hour and the temperature kept between 80° and 90° C. by circulating cold water or steam through the coils as may be necessary. After all the vinyl acetate has been added, the mixture is agitated for about one hour, the temperature being maintained at 80° to 90° C., when the mixture will be found to contain about 219 lbs. of ethylidene diacetate corresponding to about 90% of the amount theoretically possible from the vinyl acetate used. The liquor is then treated for the separation of ethylidene diacetate, as in Example 1. It will be understood that any of the modifications of the process disclosed in application Serial Number 422,885, filed November 8th, 1920, for the production of catalyst may be used.

*Example 3.*

The process of Example 2 may be slightly modified as follows:—30 grams of mercuric oxide is dissolved in 100 grams of glacial acetic acid and heated to 70° to 80° C. with the consequent formation of mercuric acetate and water. 12 grams 70% oleum is added to combine with the water and form sulphuric acid in amount sufficient to precipitate the mercuric acetate as mercuric sulphate. The liquor and precipitate are then cooled to 20° C. To this mixture is added 500 grams glacial acetic acid and 860 grams vinyl acetate in a vessel provided with a reflux condenser. At the end of about ten minutes, the whole will be in ebullition, and, after approximately thirty minutes, the larger part of the vinyl acetate will have combined with the acetic acid and the resulting liquid will contain about 1240 grams ethylidene diacetate, representing a yield of 85% used. This is then treated as in Example 1, using 12 grams anhydrous sodium acetate.

*Example 4.*

600 grams glacial acetic acid is mixed with 860 grams vinyl acetate and a current of sulphur dioxide passed in until 20 to 30 grams have been absorbed. The mixture is then boiled for about two hours in a vessel fitted with a reflux condenser, when the reaction will be reasonably complete. The product is treated for recovery of ethylidene diacetate as in Example 1, using 12 grams anhydrous sodium acetate.

*Example 5.*

The procedure is as in Example 4, except that gaseous sulphuric anhydride is passed in until about 20 grams have been absorbed. It is to be noted that equally good results may be obtained by substituting gaseous sulphuric anhydride for the oleum used in Examples 1 and 3.

It will be noted that the foregoing examples relate exclusively to the manufacture of ethylidene diacetate, but it must not be concluded therefrom that the process is in any way limited to the manufacture of this particular material, since with suitable modifications of temperature and quantities of the substances used, the process may be carried out and other diesters such as ethylidene diformate produced from vinyl formate and formic acid and ethylidene dibutyrate produced from vinyl butyrate and butyric acid.

Whereas in carrying out the reaction it is found advisable to heat the olefine ester and carboxylic acid to a temperature at which gentle ebullition takes place, it is understood that reaction will proceed at lower temperatures although the speed of reaction is much reduced.

In the appended claims the term "oxide of sulphur" must not be construed as limited to the free oxides, such as $SO_2$, but must be held to include these oxides either free or combined in the form of oleum, sulphuric acid or with mercury compounds such as the mercuric sulphate mentioned in example 2 or in any other manner suitable for the process.

Having thus described our invention, what we claim is:—

1. A process of making diesters, which consists in bringing together a vinyl ester and the corresponding carboxylic acid in presence of a catalyst.

2. A method of making diesters, which consists in bringing together a vinyl ester and the corresponding carboxylic acid in presence of a catalyst, and maintaining a temperature at which ebullition occurs.

3. A process of making diesters, which consists in bringing together a vinyl ester and the corresponding carboxylic acid in presence of a catalyst, heating the mixture and maintaining approximately the temperature of ebullition of the mixture.

4. A process of making diesters, which comprises bringing together a vinyl ester and the corresponding carboxylic acid in presence of a catalyst, and condensing vapors arising from the reaction and returning the condensate to the reaction.

5. A process of making diesters, which comprises bringing together a vinyl ester and the corresponding carboxylic acid in presence of a catalyst comprising an oxide of sulphur.

6. A process of making ethylidene diacetate, which comprises bringing together vinyl acetate and acetic acid in presence of a catalyst.

7. A process of making ethylidene diacetate, which comprises bringing together vinyl acetate and acetic acid in presence of a catalyst, and maintaining the temperature of reaction under 100°.

8. A process of making ethylidene diacetate, which comprises bringing together vinyl acetate and acetic acid in presence of a catalyst, heating the mixture, and cooling as necessary to maintain a temperature under 100° C.

9. A method of making ethylidene diacetate, which comprises bringing together vinyl acetate and acetic acid in presence of a suitable catalyst, and condensing vaporous products of the reaction and returning the same into the reaction.

10. A process of making ethylidene diacetate, which comprises bringing together vinyl acetate and acetic acid in presence of a catalyst containing an oxide of sulphur.

11. A method of making ethylidene diacetate, which comprises bringing together vinyl acetate and acetic acid, and maintaining a temperature under 120° C., and using as a catalyst an oxide of sulphur.

In witness whereof, we have hereunto set our hands.

FREDERICK W. SKIRROW.
JAMES DICK.